UNITED STATES PATENT OFFICE.

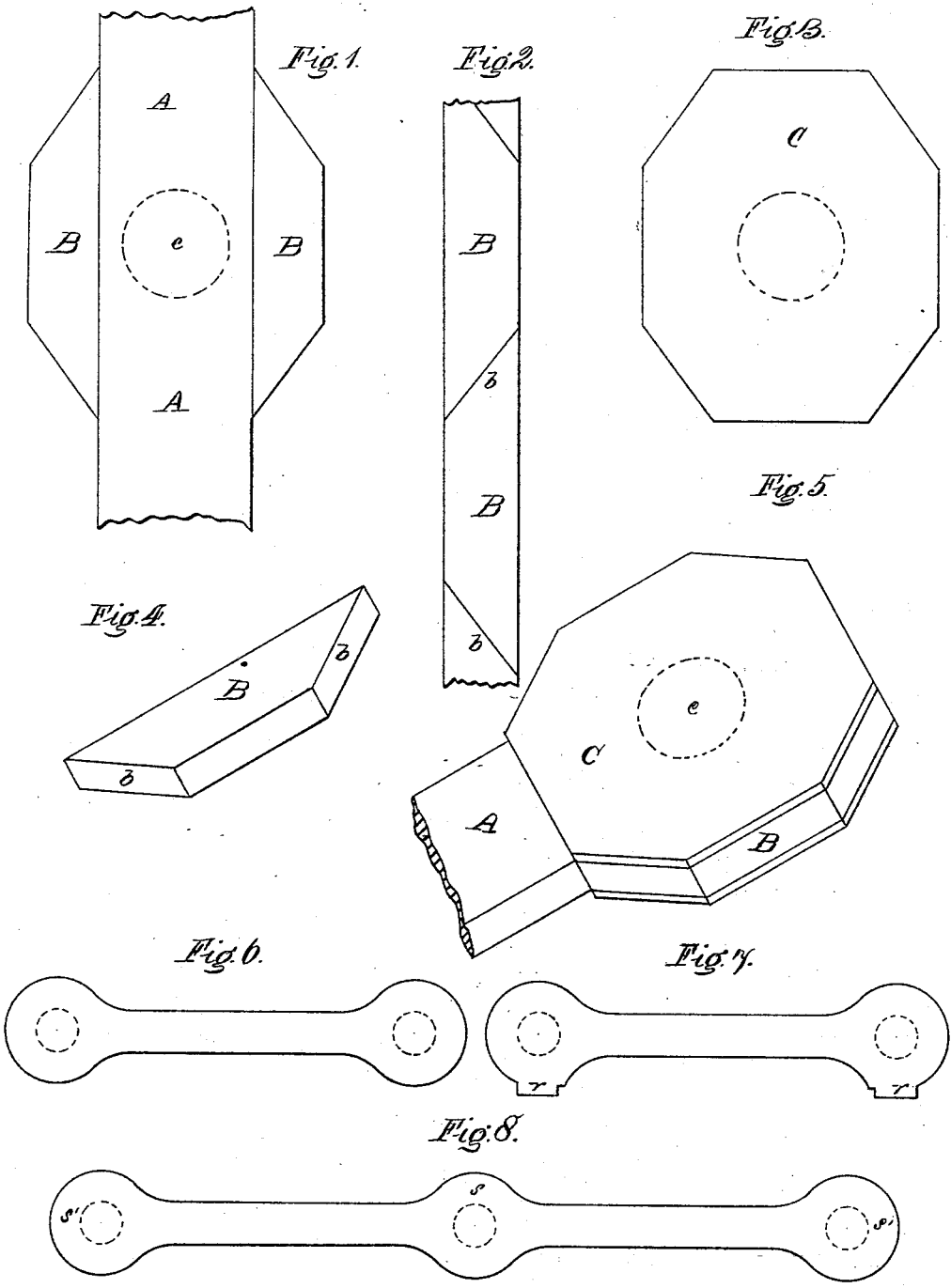

CHARLES L. STROBEL, OF PITTSBURG, PENNSYLVANIA.

MANUFACTURE OF EYE-BARS.

SPECIFICATION forming part of Letters Patent No. 277,373, dated May 8, 1883.

Application filed January 29, 1883. (No model.)

*To all whom it may concern:*

Be it known that I, CHARLES L. STROBEL, a citizen of the United States, residing at Pittsburg, county of Allegheny, State of Pennsylvania, have invented or discovered a new and useful Improvement in the Manufacture of Eye-Bars; and I do hereby declare the following to be a full, clear, concise, and exact description thereof, reference being had to the accompanying drawings, making a part of this specification, in which—like letters indicating like parts—

Figure 1 is a plan view of blanks arranged in a pile or in proper relative positions for forming an enlarged head on a bar, the same being illustrative of my invention. Fig. 2 is a plan view of a bar illustrative of the manner of shearing or cutting the same without waste to form blanks for use in carrying out my invention. Fig. 3 is a plan view of a cap or cover plate employed in forming the head-pile. Fig. 4 is a perspective view of one of the blanks cut from the bar, Fig. 2. Fig. 5 is a perspective view of the pile, illustrative of the manner of arranging and uniting the several blanks to form the head or eye; and Figs. 6, 7, and 8 are plan views, to a small scale, of different forms of eye-bars, also illustrative of my invention.

My invention relates to certain improvements in the art or method of making eye-bars for bridge or other structural purposes; and, in general terms, it consists in a new and improved method of forming a head or eye upon a bar, either at its ends or at any desired point in its length, as hereinafter more fully described and claimed.

The purpose of my invention is to provide for forming eye or head enlargements upon bars at any desired points in their length, and of any desired form, regular or irregular in outline, by cheap and easily-operated means, and with such an arrangement or disposition of metal that its fiber shall lie in one direction, and shall not be weakened by bending or upsetting or other violent strain or contortion.

In working my invention wrought-metal bars A are employed, of iron or steel, and of any desired length and form, a rectangular form being preferred, and of size and area in cross-section equal to that desired in the shaft or shank of the finished bar.

In making the desired head or enlargements upon this bar I make use of blanks B, sheared by diagonal cuts *b* from a rolled bar, Fig. 2, the width of which is usually about one-half the width of the bar A, and the thickness of which, to obtain the requisite material for forming the head, is somewhat greater than that of the bar A. In case the bar A is extra thick and heavy, these blanks B may be formed of thinner pieces, and two or more piled upon each other to secure the requisite thickness. This is done principally to facilitate shearing the blanks, which is preferably done cold.

In order to prevent waste of metal, and also to secure a form adapted to match with other parts in giving shape to the enlargement, the cuts *b*, for severing the blanks, are made diagonally across the bar, as stated, and successive cuts are made in opposite directions, as illustrated in Fig. 2, thereby giving one long and one short edge to each blank. These blanks may be varied in form to suit any special shape of head which it is desired to make, the bar, Fig. 2, being taken wider or narrower for this purpose, and the cuts forming a larger or smaller angle with the edges of the bar, and being straight, curved, or irregular. In forming the head, they are placed upon the opposite side edges of the bar A, as represented in Fig. 1, at the desired point of enlargement, whether at the end or at any intermediate point in its length, the long sides of the blanks being against the bar, and they may be held in this position by any suitable metallic clamp. This part of the bar and the blanks may then be brought to a welding-heat in any suitable furnace, and the parts be welded by hammering, or by compression with shaping-dies or other suitable tools, thereby securing a homogeneous and complete metallic union between the parts, and forming a body of metal the fiber of which is straight and parallel, and all arranged in the direction of the bar. This swaging or welding operation can be performed at intermediate points in the length of the bar—for example, at its center *s*, (see Fig. 8,) as well as at its ends *s'*—and in doing it any exterior form may be given, either curved or polygonal, and regular, as in Figs. 6 and 8, or with projecting lugs r on the side of the eye or head. (See Fig. 7.) The facility thus afforded, both in forming the enlargement at any desired point and in giving it any desired shape, is an important and material advantage.

In welding the blanks B to the bar, as above described, seams or other markings are liable to be formed along the line of weld, which it is desirable to avoid. In order to do this, and also to protect the surfaces to be welded from the injurious action of air-drafts during heating in the furnace, and from too rapid cooling after leaving the furnace, the blanks B may be made of the same thickness as the bar A, using either one or more layers to make this thickness, as described above, and the pile thus made may then be covered with plates C, Fig. 3, which are sheared from comparatively thin plates approximately to the size and form of the enlargement made by the blanks B B. These cover-plates are placed upon the opposite side faces of the enlargement, (see Fig. 5,) either before or after the blanks B are welded to the bar, preferably before, and are held in place by suitable clamps or other means. They are then brought to welding-heat and firmly welded and wrought into the substance of the metal forming the enlargement to form one solid mass of metal. For the sake of economy and convenience in saving reheating, repeated working, and handling, I prefer to bind the blanks B and C at the same time, by suitable clamps upon the bar A, at the desired point of enlargement, thereby forming one compound pile made up of blanks having shape especially adapted to produce the desired form of enlargement, and such pile is then brought to welding-heat and worked or wrought with a hammer or other shaping dies or tools, substantially as before described. The employment of these cover-plates C is not essential, for good and desirable eye-enlargements may be made, as before described, without them. I prefer to use them, however, for the purposes stated. The pile thus formed affords advantages in heating, welding, and in disposition of fiber similar to those secured by the mode of piling muck and rerolled bars for heavy work in use in forge and rolling mills. If desired, the welding and finishing may be done at one heat, though in most cases it will be advisable to give a low second heat for finishing.

No heating will be required in fitting the blanks preparatory to piling, neither will it be necessary to fit the bar A to any other form than that usually given in rolling. In these respects decided advantages are gained over methods involving heating the blanks, bending or otherwise shaping them, and also the bar, to special forms preparatory to welding or piling them. If steel be used in making the bars, it is important that it should have good welding properties, when as good results will be obtained as with wrought-iron. The enlargement being formed on the bar, as above described, the eye or pin-hole c may be formed in the usual way by punching, drilling, or otherwise.

By means of my invention I secure a good and efficient eye-bar, one that will break, if tested to destruction, in the body or shank of the bar in preference to the head, thereby developing the full strength of the material. To attain this has hitherto been a matter of much difficulty and expense. My improvement accomplishes it by disposing the material out of which the head is formed in such manner that the surfaces to be welded are prevented from moving upon each other to any great extent during the working, and avoiding all violent distortion or breaking of the fiber of the material, and by locating the weld along lines giving ample area to resist the strains.

Special forms of heads can be made—such as are shown in Fig. 7—which can either not be made at all by other existing methods, or only with great difficulty and at great expense. These can be made by my improved method as easily, cheaply, and efficiently as the ordinary head. Such special forms are frequently of good service in bridge construction.

Bars can be made with head or heads at intermediate points, as in Fig. 8, the body of the original bar running continuously from end to end, and the intermediate heads being formed by side or side and top and bottom piling-pieces welded to the sides of the bar, as before described. This feature of my improvement is practically of great advantage and importance, since by the use of such bars in the tension members of bridges and other structures a considerable saving in material and labor is effected in the following manner: An eye-bar with one intermediate head would be made of twice the length of the ordinary eye-bar with end heads only, so that one long bar with three heads takes the place of two bars of half its length with four heads. The material and labor for making one head is therefore saved, and since it usually requires about ten per cent. of the weight of the uniform bar between pin-centers to make one head this saving in material alone is considerable. Certain constructive advantages—such as a shorter length of pin at the intermediate head and greater compactness—are also secured by the use of such eye-bars. By methods heretofore known and practiced, however, such intermediate heads could not be satisfactorily made, the only resort being to form the intermediate head by itself, independent of the bar, and afterward weld it to the two halves of the bar by scarfed ends; but a bar made in this manner is not reliable. By my invention I overcome every difficulty in the manufacture of such bars, insuring both efficiency and economy.

I claim herein as my invention—

1. The method herein described of forming eye-bars, consisting in welding blanks B to the opposite side edges of the bar-blank A at the desired points of enlargement, and forming a pin or bolt hole, c, through such enlargement, substantially as set forth.

2. The method herein described of forming a head or eye enlargement on eye-bars, consisting in welding straight fiber-blanks B to the opposite side edges of a bar-blank at the desired point of enlargement and welding cover-plates C to the side faces of the enlargement made by the blanks A and B, substantially as set forth.

In testimony whereof I have hereunto set my hand.

CHARLES. L. STROBEL.

Witnesses:
S. HARVEY THOMPSON,
C. L. PARKER.